Aug. 31, 1965 N. E. MAESTRE 3,204,195

OSCILLATOR FREQUENCY STABILIZATION DURING LOSS OF AFC SIGNAL

Filed July 23, 1962 2 Sheets-Sheet 1

INVENTOR
NEIL E. MAESTRE

BY Paris, Haskell & Levine
ATTORNEYS

OSCILLATOR FREQUENCY STABILIZATION DURING LOSS OF AFC SIGNAL

Filed July 23, 1962 2 Sheets-Sheet 2

INVENTOR
NEIL E. MAESTRE

BY *Paris, Haskell & Levine*

ATTORNEYS

United States Patent Office 3,204,195
Patented Aug. 31, 1965

3,204,195

OSCILLATOR FREQUENCY STABILIZATION DURING LOSS OF AFC SIGNAL

Neil E. Maestre, Levittown, N.J., assignor, by mesne assignments, to United Aircraft Corporation, a corporation of Delaware Filed July 23, 1962, Ser. No. 211,537
10 Claims. (Cl. 331—10)

This invention generally relates to improvements in slaved variable frequency oscillators for use in data pulse telemetering systems among others, and more particularly is concerned with an improved slaved oscillator having a memory to maintain its frequency stability for relatively long time periods despite interruptions or temporary loss of its slaving or synchronizing signal.

In time multiplex data pulse telemetering systems it is often necessary to provide an oscillator system that is very accurately slaved or synchronized in frequency with a remote source of master oscillations. Quite often such slaved oscillators are provided in the form of a voltage controlled multivibrator which is synchronized in frequency with the remote source by means of a controlling voltage generated by the same pulses from the remote source that carry the data information.

During such telemetry operation, it oftentimes occurs that the transmissions of the data pulses are interrupted, sometimes only momentarily, whereby the voltage signal controlling the oscillator frequency is removed and the oscillator loses frequency synchronism with the master thereby resulting in errors in the decommutation of the telemetered data.

To overcome this source of error according to the present invention there is provided an improved slaved oscillator system wherein the oscillator is supplied with a continuously operating dynamic memory and therefore continues to oscillate at its preexisting frequency despite loss of its synchronizing signal. In this manner, when the data link is restored and the synchronizing voltage is reapplied to the oscillator, the oscillator is in synchronism or substantially so with the remote source and the errors in decommutation of the pulse data are accordingly minimized.

It is accordingly a principal object of the invention to provide an improved slaved oscillator capable of rapidly varying its frequency in response to changes in a master or control frequency yet maintaining its frequency stability for relatively long periods of time despite interruptions or loss of the master oscillation.

A further object is to provide a phase synchronized multivibrator having a memory to stabilize its frequency in the event of interruption or loss of the master frequency.

A still further object is to provide a variable frequency oscillator having automatic frequency stabilization at its different frequencies.

Still another object is to provide an improved feedback stabilized oscillator capable of being rapidly synchronized with variations of a master oscillation.

A still further object is to provide an improved false pulse generator for pulse data telemetry systems.

Figure 2:
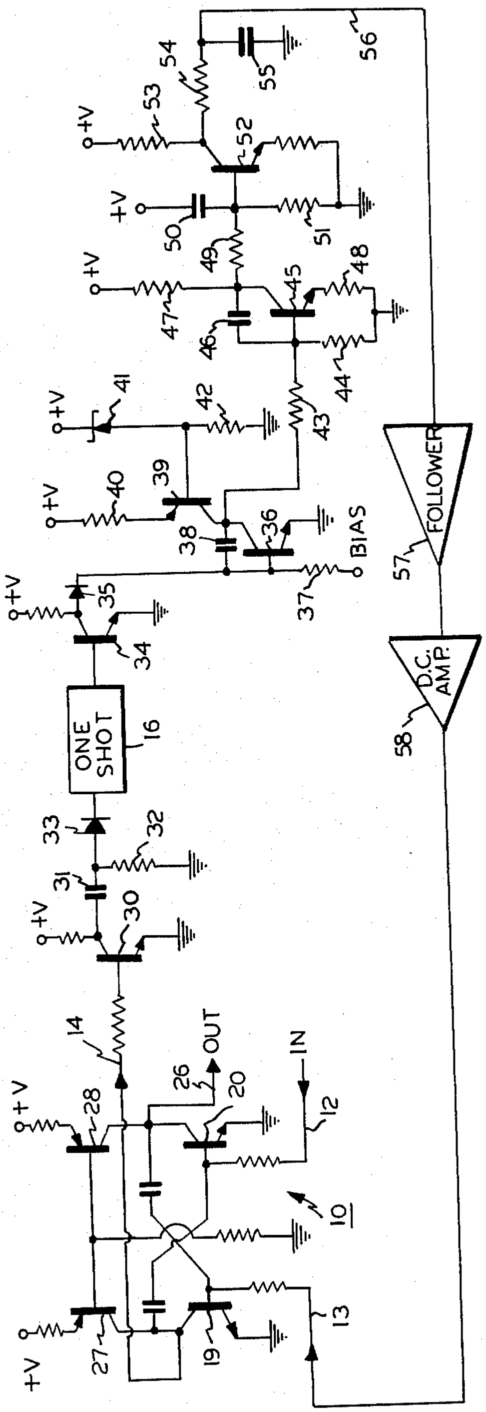
Figure 1:
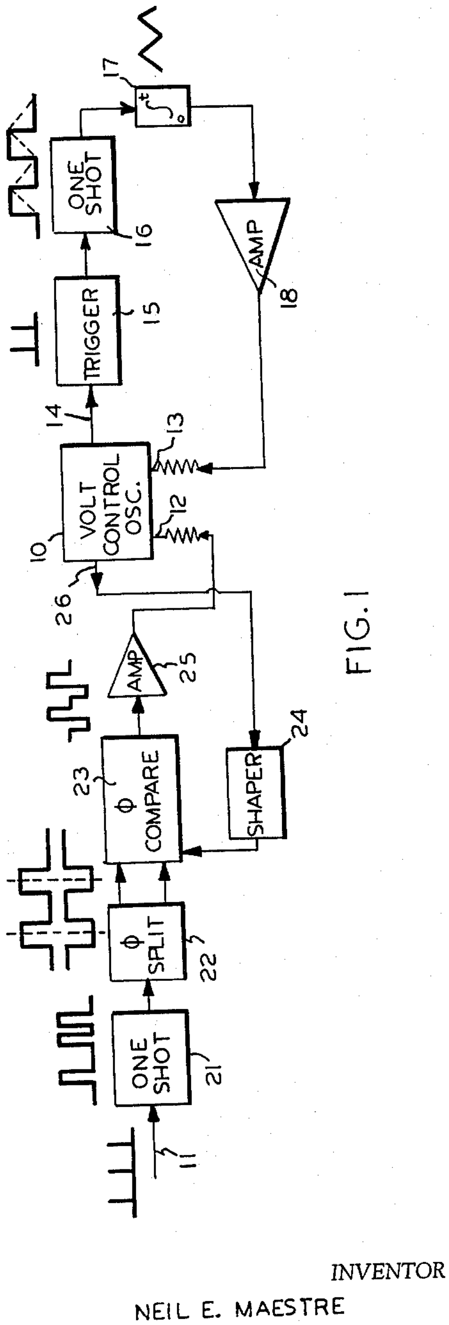
Figure 3:
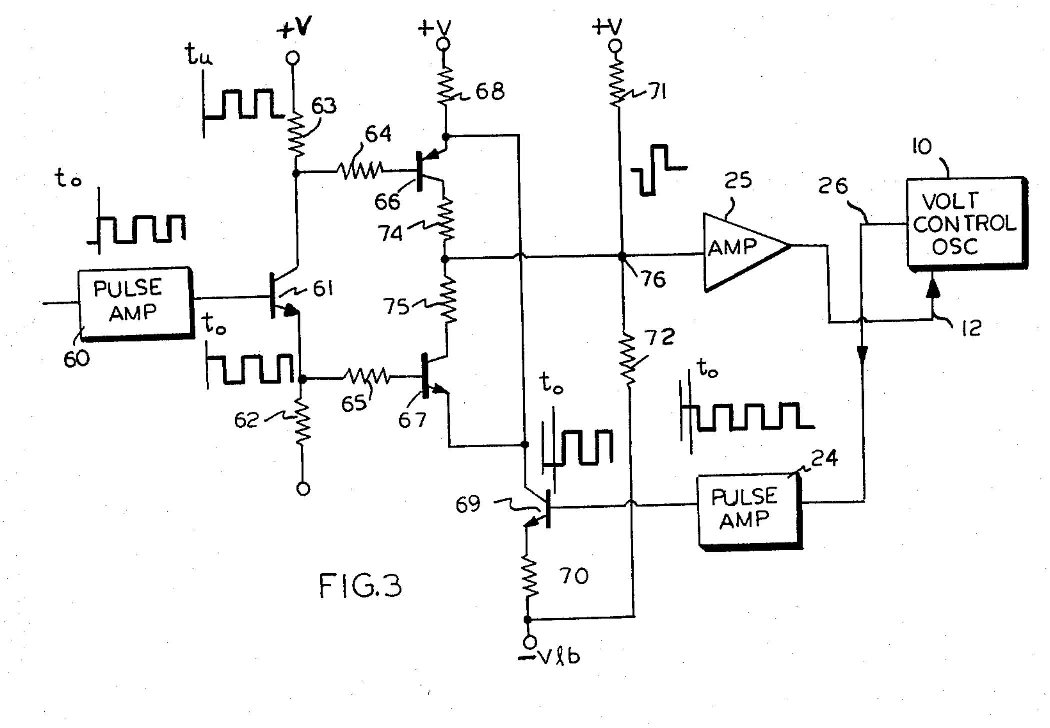
Figure 4:
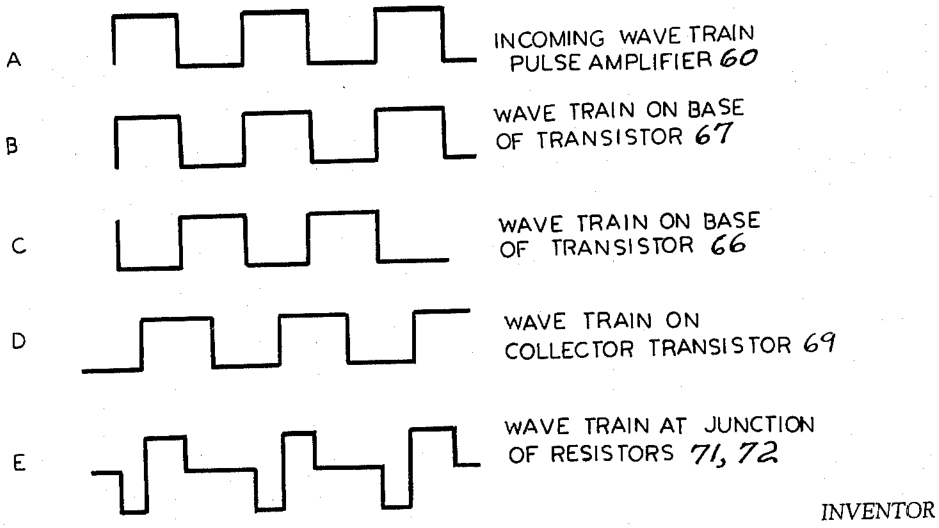

Other objects and additional advantages will be more readily appreciated by those skilled in the art after a detailed consideration of the following specification taken with the accompanying drawing wherein FIG. 1 is a block diagram schematically illustrating one preferred embodiment of the invention, FIG. 2 is an electrical schematic illustration of a preferred multivibrator circuit and a preferred memory circuit, FIG. 3 is an electrical schematic illustration of a preferred phase splitter and comparator circuit, and FIG. 4 is a timing diagram for illustrating the operation of the phase splitter and comparator circuit.

Referring now to the drawings, there is schematically shown in FIG. 1, a voltage controlled variable frequency oscillator circuit 10, that is adapted to be slaved or synchronized in frequency with master oscillations being received over input line 11. The voltage controlled oscillator is preferably a free running multivibrator as shown in FIG. 2, wherein a pair of transistors 19 and 20 are interconnected in feedback to alternately conduct and be cut off from conduction. In such circuit, an external voltage signal being applied to the base electrode of either transistor varies the frequency of the oscillator so that in FIG. 1 the oscillator 10 is represented as having two frequency control voltage inputs at lines 12 and 13 as shown.

For synchronizing the frequency of the multivibrator circuit 10 with that of the master oscillations over line 11, there is provided a phase comparator circuit interconnecting the input line 11 with one of the control lines 12 of the multivibrator 10 and producing a variable control voltage at this line 12 according to any frequency error, thereby to slave the frequency of the multivibrator with that of the master oscillations. As will be discussed in greater detail, this control is very accurate whereby the multivibrator 10 is very rapidly phase synchronized with the individual master pulses on line 11.

However, as is characteristic of voltage controlled multivibrators, in the event that the master pulses 11 are temporarily interrupted, the multivibrator will usually revert to its quiescent frequency and accordingly lose synchronism with the master pulses 11. To prevent this from happening, there is supplied a dynamic memory circuit providing a second control voltage at the other control input 13 of the multivibrator 10, which second control voltage serves to stabilize or maintain the frequency of the oscillator at its preexisting rate in the event that the master pulses over line 11 are interrupted.

This dynamic memory circuit comprises an external feedback channel including, in cascade, a triggering circuit or differentiator 15, a uniform pulse former circuit or one shot multivibrator 16, a ramp or sawtooth wave generator circuit 17, and finally, a low frequency pass filter amplifier combination 18.

In operation of the memory circuit, output pulses from one side of the multivibrator are directed over line 14 to the differentiator circuit 15 where the leading edges thereof are differentiated to produce sharp edged trigger pulses that are spaced in time according to the frequency of the oscillator.

Each of these trigger pulses actuates the one shot multivibrator 16 to produce uniform waveform impulses which are thence directed to control the ramp or sawtooth wavegenerator 17. For very precise control, the ramp voltages being produced are also very linear and triangular in waveshape and the number of ramps produced per unit of time will very accurately vary in proportion to the frequency of the mutilvibrator.

The ramp signals are then directed through a low pass filter amplifier 18 which essentially operates as a rapidly responding integrator since it removes the high frequency components from the ramp signals and produces an amplified varying voltage whose amplitude is proportional to the frequency or number of ramp signals produced during each unit of time.

As a result the voltage control signal directed over line 13 to the second input of the multivibrator 10 is very accurately proportional to the preexisting frequency of the multivibrator and in the absence of a detected voltage at 13 normally maintains the frequency of the multivibrator stabilized at its preexisting frequency of a few cycles before.

Briefly recapitulating the overall operation of the circuit, the master incoming pulses received over input line 11 are compared in phase relation with feedback pulses from the multivibrator 10 and an error signal is produced and directed to the multivibrator over control line 12 to lock the oscillator frequency to the incoming master pulses.

The dynamic memory circuit channel responds to the multivibrator 10 to continuously produce uniform waveshape ramp or triangular pulses at the preexisting frequency of the multivibrator, and, assuming synchronism to exist between the multivibrator frequency and the master pulses, the memory channel produces a voltage control signal at control line 13 to aid in stabilizing the multivibrator frequency.

If a change in frequency appears in the incoming master pulses on line 11, the phase comparison circuit channel produces an error control voltage over control line 12 to change the multivibrator frequency and again bring it into synchronism with the master pulses. As the multivibrator changes frequency, the memory channel also correspondingly changes the frequency or number of ramp signals produced per unit of time and accordingly produces a change in the control voltage over control line 13. This latter control voltage over line 13 aids the control voltage over line 12 to rapidly bring the multivibrator into frequency synchronism with the master pulses to again stabilize the multivibrator.

It has been observed that with this circuit as described, the frequency of the multivibrator rapidly becomes synchronized with the master pulses within about three cycles or master pulses.

In the event that the master pulses are momentarily interrupted, or if one or more master pulses are missing from the train, the dynamic memory circuit channel continues to operate at its preexisting rate or frequency and supplies a control voltage over line 13 to stably maintain the frequency of the multivibrator 10 until the master pulses are resumed.

It is to be particularly noted that the dynamic memory circuit serves to stablize the frequency of multivibrator 10 at any one of its different frequencies over its range of variation as controlled by the synchronizing voltage at input 12. Furthermore the memory circuit is also fast acting and does not impose any substantial braking action to impede the rapid synchronization of the multivibrator whenever a synchronizing voltage is present at input 12.

Returning to FIG. 1 for a more detailed consideration of the preferred circuitry, the synchronizing portion of the circuit comprises a one shot multivibrator 21 that responds to each of the incoming master trigger pulses over line 11 to produce uniform waveshape pulses as indicated.

Each of these uniform pulses are directed to a 180° phase splitter circuit 22 that produces a pair of pulses in response to each incoming pulse, one of which is in phase and the other displaced by 180°. These phase displaced pulses are next directed to a comparator circuit 23 where they are phase compared with pulses from the multivibrator 10 that are received in feedback over line 26 and applied through pulse shaper unit 24.

At the output of the phase comparator circuit 23, there is accordingly provided a voltage signal whose amplitude is proportional to the difference in phase between the pulses produced by oscillator 10 and the incoming master pulses. This voltage is suitably amplified by amplifier 25 and is thereafter applied over line 12 to produce the synchronizing voltage to the oscillator.

FIG. 3 illustrates details of a preferred circuit for the 180° phase splitter 22 and comparator 23 and FIG. 4 is a waveform timing diagram for illustrating the operation of these circuits.

As shown the incoming master pulses are applied through a pulse amplifier-shaper 60 and thence directed to the base electrode of transistor 61. The transistor 61 is connected in series with resistors 62 and 63 whereby at the collector electrode thereof, the master pulses are inverted or delayed by 180° and at the emitter thereof the master pulses are reproduced in phase.

Referring to FIG. 4, the incoming shaped master pulses are illustrated by the uppermost waveform, labeled A, and the waveforms B and C illustrate the 180 degree phase displaced signals appearing at the emitter and collector respectively of transistor 61.

The inverted pulse train from the collector electrode is directed through a current limiting resistor 64 to the base of a PNP transistor 66 and the in phase pulse train is directed to the base electrode of an opposite NPN transistor 67 whereby both of the opposite type transistors 66 and 67 are energized in synchronism with the correct polarity pulses to turn on and off together.

The operation of this preferred phase comparison circuit is performed by the gating on and off of a transistor 69 in response to feedback pulses obtained from the multivibrator 10.

In operation, as the gating transistor 69 is rendered conducting, the drop in potential at its collector electrode biases the emitter of transistor 67 to a condition permitting conduction and biases the emitter of the opposite type transistor 66 to a nonconducting condition. Similarly as the gating transistor 69 is rendered nonconducting, the biasing is reversed with transistor 66 being conditioned for conduction and transistor 67 rendered nonconducting. Thus the gating transistor 69 selectively permits conduction through only one of the transistors 66 or 67 at a time and cuts off the other from conduction.

When transistor 66 conducts currents, the current flow through resistors 68, 74, and 72 produces a positive voltage change across resistor 72 and when transistor 67 conducts current, the current flow through resistors 71 and 75 produces a negative voltage change across resistor 72.

Presupposing that the feedback pulses from the oscillator 10 and through the pulse amplifier 24 to the base electrode of gating transistor 69, occur in time equally between the 180° phase split master pulses; or in other words are phase displaced by about 90°, as shown in waveform D, then the conduction time of transistor 66 is about equal to that of transistor 67 and the waveform E produced at junction 76 is approximately symmetrical with equal positive and negative areas. As this waveform is averaged or integrated by amplifier 25, the error control voltage over line 12 is minimized. However, should the master pulses change in frequency, this phase relationship is changed and the error signal at junction 76 becomes predominantly more positive or negative thereby to increase the error voltage over line 12 to the multivibrator 10 and accordingly change the frequency thereof, as discussed above, to bring about a new synchronism of the oscillator with the master pulses.

As shown in FIG. 2, the voltage control oscillator 10 may be of somewhat conventional form comprised of a pair of transistors 19 and 20 interconnected in mutual feedback, with the collector electrode of each being coupled to the base electrode of the other through a time delay circuit including a capacitor and resistor. In series with each of these transistors 19 and 20 there is provided an opposite type transistor such as 27 and 28, respectively, whose base electrodes are connected in common to ground through a resistor as shown. The function being provided by these additional transistors 27 and 28, is to aid in the rapid switching or oscillation of the main transistors 19 and 20.

As shown, the synchronizing voltage control input to the oscillator 10 is directed over line 12 and through a resistor to the base electrode of transistor 20, and the memory voltage control is likewise directed through a resistor to the base electrode of the second transistor 19. The feedback voltage from the oscillator 10 being directed over line 26 is taken from the collector electrode of the same transistor 20 that receives the synchronizing input voltage 12, and, as indicated in FIG. 1, this output provides pulses to a pulse shaper circuit 24 feeding the comparator circuit 23.

The second output pulses for use in the memory circuit are taken from the collector electrode of transistor 19 and directed over output line 14 and through a resistor to the base electrode of a transistor 30 which serves to impedance match the multivibrator 10 to the memory circuit. The transistor 30 is provided with a high input impedance whereby the oscillator is not loaded or short circuited by the memory circuit.

The transistor 30 also amplifies the voltage pulses and directs these pulses to the trigger circuit 15, which is preferably a differentiating circuit, including a capacitor 31 and resistor 32, thereby to produce trigger pulses at the leading edge and trailing edge of each impulse on the multivibrator 10. The leading edge trigger impulses are directed through a diode 33 which blocks the passage of the trailing edge impulses, whereby only the leading edge of each oscillator pulse is directed to a one-shot multivibrator 16. As discussed above, the one-shot multivibrator 16 produces uniform volt time impulses corresponding to each of the trigger pulses and directs these to a further impedance matching transistor 34 which serves to isolate the one-shot multivibrator from the ramp or sawtooth wave producing circuit 17.

The transistor 34 also operates to invert each of the positive pulses being received from a one-shot multivibrator thereby triggering the ramp producing circuit with uniform negative impulses corresponding to each of the pulses from the oscillator 10.

The preferred sawtooth wave or ramp waveshape producing circuit generally comprises a storage capacitor 38 that is interconnected between the collector and base electrodes of a transistor 36. The transistor 36 is normally biased through a resistance 37 into conducting condition. Since the transistor 36 is conducting, its collector electrode is also at substantially the same potential as its emitter electrode which is connected to ground. Consequently, both sides of the storage capacitor 38 are normally maintained at ground potential and no charge is developed across the storage capacitor. Upon a negative pulse being received from the output of transistor 34, the transistor 36 is rendered nonconducting, thereby raising the potential of its collector element electrode from ground potential, and permitting the capacitor 38 to be charged by a constant current producing circuit including a series connected transistor 39 and a large dominating resistor 40 being energized by a positive source of potential. A constant current is provided by employing a very large resistor 40 that dominates the current flow through the transistor 39, and providing a constant biasing potential at the base electrode of transistor 39 by means of a Zener diode 41 and a resistor 42. Consequently, a constant current always flows through the transistor 39 to the collector electrode of transistor 36.

As noted above, the transistor 36 is normally biased into a conducting condition so that this constant current flow normally passes through the transistor from the collector to the emitter and to ground, and the capacitor 38 normally remains uncharged. However, upon a negative pulse being applied to the base of transistor 36, the transistor 36 is rendered nonconductive, and this constant current flow is therefore directed through the capacitor 38 to uniformly charge the capacitor 38 and produce a sawtooth voltage wave across the capacitor 38. At the termination of this negative pulse produced by the one-shot multivibrator 16, the transistor 36 is again rendered conductive permitting the storage capacitor 38 to discharge through the transistor 36 to produce the second half of the sawtooth wave. Thus, in response to each negative impulse derived from the transistor 34 in response to the one-shot multivibrator 16, a sawtooth wave is produced across capacitor 38.

The sawtooth waves are thence directed through first and second cascaded direct current amplifiers, including transistors 45 and transistor 52 which are interconnected in direct coupled cascaded connection as shown, and with each of these direct current stages being provided with a filter capacitor 50, and 55, respectively, at its output to filter out the higher frequency components of the sawtooth wave and produce over line 56 a slowly varying memory voltage having an amplitude proportional to the frequency of the sawtooth waves being produced. This voltage over line 56 is thence directed through an impedance matching circuit, preferably comprising an emitter follower circuit 57, and then is further amplified by direct current amplifier 58 to be applied to the second input terminal 13 leading to the oscillator 10. Since the memory voltage over line 13 is slowly varying and at an average amplitude proportional to the preexisting frequency of the oscillator, it provides a memory or stabilizing feedback to maintain the frequency of the multivibrator 10 at its preexisting rate. Thus, in the event that the synchronizing voltage over line 12 is momentarily disconnected, the memory voltage over line 13 maintains control of the multivibrator to stabilize its frequency at the preexisting rate, all as discussed above.

Although but one preferred embodiment of the invention has been illustrated and described, it is believed that many changes may be made by those skilled in the art without departing from the spirit and scope of this invention. Accordingly, this invention is to be considered as being limited only by the following claims appended hereto.

What is claimed is:

1. A slaved oscillator having automatic frequency stabilization despite interruption of the master oscillation comprising: a free running multivibrator comprised of a pair of transistors inter-connected in mutual feedback relationship, a phase comparison circuit energizable by a variable frequency master oscillation and by the multivibrator oscillation to energize one of said transistors and maintain frequency and phase synchronism between the multivibrator frequency and the master oscillation, and a memory circuit energized by said multivibrator and responsive to the frequency of the multivibrator to produce a signal proportional to the existing frequency of said multivibrator, said memory circuit being connected in feedback to the other transistor to stabilize the frequency of the multivibrator upon the interruption of the master oscillation at the frequency previously existing before such interruption.

2. In the oscillator of claim 1, said phase comparison circuit comprising a phase splitter means responsive to the master oscillation for producing a pair of phase displaced signals and a comparator for referencing said signals against the phase of said multivibrator oscillations to produce a control signal for energizing said one of the transistors.

3. In the oscillator of claim 1, said memory circuit comprising a wave shaping means for producing uniform pulses for each oscillation of said multivibrator, an integrating circuit for integrating said pulses to produce a variable control signal proportional to the multivibrator frequency, and means for applying said variable control signal to the other of said transistors.

4. In the oscillator of claim 3, said integrator circuit including a sawtooth wave generator coupled to a low pass frequency filter whereby said variable control signal is rapidly variable with changes in the multivibrator frequency.

5. A voltage controlled variable frequency oscillator comprising: an oscillation circuit comprised of a pair of interconnected transistors coupled for normal free running oscillation, control means responsive to an external variable control source and to the frequency and phase of the oscillator for controlling one of said transistors by a variable control signal proportional to the difference therebetween to determine the frequency of oscillation of said oscillator circuit, and a feedback means for separately controlling the other of said transistors by an externally produced variable bias control voltage, said latter means comprised of means responsive to the frequency of the multivibrator for producing said variable bias control voltage having an amplitude in proportion to the frequency of oscillation, whereby in the event of cessation of said control signal, said variable bias control voltage determines the frequency of the oscillator.

6. A synchronized oscillator circuit having a memory for continuing oscillation at the preexisting frequency in the absence or interruption of the synchronizing signal comprising: a free running multivibrator having a pair of feedback coupled electron valves, an external energizing circuit for energizing one of said valves with a first control signal proportional to the deviation of an externally produced master oscillation from the frequency and phase of the multivibrator to synchronize the frequency of the multivibrator with said externally produced master oscillation, a separate external feedback circuit responsive to the frequency of the multivibrator to produce a second variable control signal proportional to such frequency to simultaneously and separately energize the other valve, said first variable control signal controlling the multivibrator frequency into synchronism with the master oscillation but in the event of interruption of said first control signal said second control signal stabilizing the frequency thereof at its preexisting rate until resumption of the first control signal.

7. A synchronized voltage controlled multivibrator having a memory to continue its oscillation at a preexisting rate upon the interruption of its voltage control comprising: a free running multivibrator comprising a pair of transistors having feedback coupled base and collector electrodes, voltage controlling means for energizing the base electrode of one of the transistors with a variable voltage signal to synchronize the frequency of the multivibrator with an externally produced oscillation, said voltage controlling means including a phase splitter for producing two displaced comparison oscillations responsively to each external oscillation, and including a phase comparator for comparing each oscillation of said multivibrator with said displaced comparison oscillations and providing an error signal proportional to the difference in phase between the multivibrator oscillations and the external oscillation, stabilizing means for energizing the base electrode of the other transistor of the multivibrator with a second externally produced variable voltage signal to stabilize the frequency of the multivibrator at each different frequency thereof, whereby upon interruption of said signal, said second variable voltage signal stabilizes the oscillator frequency, said stabilizing means being responsive to the frequency of the multivibrator for producing a second variable signal whose amplitude is proportional to the frequency thereof, whereby upon the interruption of said variable voltage signal, said multivibrator is stabilized at its preexisting frequency before such interruption.

8. In the multivibrator of claim 7, said stabilizing means including a constant wave shape circuit for producing a uniform impulse for each cycle of the multivibrator, a sawtooth generator controlled by the wave shape circuit for producing a uniform ramp wave shape for each cycle, and a low pass filter for averaging said ramps to produce said second variable signal.

9. A voltage controlled variable frequency oscillator having frequency stabilizing means effective at each different frequency comprising: an electronic oscillator circuit, an external feedback path responsive to the existing frequency of the oscillator for producing a feedback signal of variable amplitude proportional to the frequency and applying said feedback signal to the oscillator to stabilize its frequency, and external biasing circuit for applying a variable bias signal to said oscillator at a different point in the oscillator circuit than the application of said feedback signal to synchronize the oscillator with an external signal source, said biasing circuit responsive to the frequency and phase of said oscillator and to an external signal source to produce said variable bias signal proportional to the deviation of said external signal from the oscillator signal.

10. A signal controlled variable frequency oscillator having frequency stabilizing means effective at each different frequency comprising: an electronic oscillator circuit, a first and second separate control signal producing means for applying separate and distinct control signals to different portions of said oscillator circuit, said first control signal means responsive to the preexisting frequency of said oscillator to produce said first control signal as a variable amplitude signal proportional to said oscillator frequency, and said second control means responsive to an externally produced signal and responsive to the preexisting frequency and phase of said oscillator to produce said second control signal as a variable signal proportional to the deviation of said external signal from said oscillator.

References Cited by the Examiner

UNITED STATES PATENTS

| | | | |
|---|---|---|---|
| 2,567,286 | 9/51 | Hugenholtz | 331—17 XR |
| 2,645,717 | 7/53 | Massman | 331—20 |
| 2,683,219 | 7/54 | Mohr | 331—14 |
| 2,788,450 | 4/57 | Sunstein et al. | 331—14 |
| 2,831,112 | 4/58 | Smeulers | 331—145 XR |
| 2,848,610 | 8/58 | Freienmuth | 331—145 XR |
| 2,897,379 | 7/59 | Hinsdale | 307—88.5 |
| 2,900,534 | 8/59 | Chater | 307—88.5 |
| 2,968,769 | 1/61 | Johnson et al. | 331—14 |
| 2,979,672 | 4/61 | Meewezen | 331—145 |

ROY LAKE, *Primary Examiner.*

JOHN KOMINSKI, *Examiner.*